(12) United States Patent
Franklin et al.

(10) Patent No.: US 7,720,313 B2
(45) Date of Patent: May 18, 2010

(54) DIGITIZED BANK CHECKS VALIDATED BY DIGITAL SIGNATURES

(75) Inventors: Gene R. Franklin, Waterloo (CA); David G. Schwartz, Waterloo (CA)

(73) Assignee: NCR Corporation, Duluth, GA (US)

( * ) Notice: Subject to any disclaimer, the term of this patent is extended or adjusted under 35 U.S.C. 154(b) by 1068 days.

(21) Appl. No.: 11/305,752

(22) Filed: Dec. 16, 2005

(65) Prior Publication Data

US 2007/0140594 A1  Jun. 21, 2007

(51) Int. Cl.
*G06K 9/00* (2006.01)
*G06K 9/60* (2006.01)

(52) U.S. Cl. ............................ 382/305; 382/137; 707/3

(58) Field of Classification Search ......... 382/135–140, 382/276; 235/380, 382.5, 375, 379, 381, 235/383, 472.01, 382; 705/33, 42, 45
See application file for complete search history.

(56) References Cited

U.S. PATENT DOCUMENTS

| | | | | |
|---|---|---|---|---|
| 4,748,673 A | * | 5/1988 | Barre et al. | 382/139 |
| 5,359,667 A | * | 10/1994 | Borowski et al. | 382/138 |
| 5,544,043 A | * | 8/1996 | Miki et al. | 705/45 |
| 5,668,897 A | * | 9/1997 | Stolfo | 382/283 |
| 6,029,147 A | * | 2/2000 | Horadan et al. | 705/35 |
| 6,574,377 B1 | * | 6/2003 | Cahill et al. | 382/305 |
| 6,860,423 B2 | * | 3/2005 | Kallin | 235/380 |
| 7,082,567 B1 | * | 7/2006 | Young et al. | 715/210 |

OTHER PUBLICATIONS

Eccho "Ways to Use Check 21", http://www.eccho.org/check21_aids_uses.php, Dec. 10, 2005.*
Cosumer law, "New Check 21 Act Effective Oct. 28, 2004: Banks No Longer Will Return Original Cancelled Checks", http://www.consumerlaw.org/initiatives/check21.shtml, Mar. 24, 2004.*

* cited by examiner

*Primary Examiner*—Vu Le
*Assistant Examiner*—Andrae S Allison
(74) *Attorney, Agent, or Firm*—Michael Chan, Esq.

(57) ABSTRACT

A system for handling files containing digitized images, such as digitized bank checks. Four digitized image-files are obtained for each check: front and back at the beginning of a process, and front and back at the end of the process. Four digital signatures are generated, one for each image-file. The four image-files are to be consolidated into a single composite file. However, for technical reasons, the content of the image-files must be altered somewhat. Thus, if the image-files are later extracted from the composite file, the extracted files will not correspond to the original image-files, and will produce different digital signatures. The invention allows the original image-files to be accurately extracted from the composite file.

9 Claims, 9 Drawing Sheets

FIG. 11

| PARAMETER | SINGLE-IMAGE VALUE | MULTI-IMAGE VALUE |
|---|---|---|
| CK1_OA | CK1_OA(OLD) | CK1_OA(NEW) |
| CK1_OB | CK1_OB(OLD) | CK1_OB(NEW) |
| CK1_POINT | 0000 | CK1_POINT(NEW) |
| CK2_OA | CK2_OA(OLD) | CK2_OA(NEW) |
| CK2_OB | CK2_OB(OLD) | CK2_OB(NEW) |
| CK2_POINT | 0000 | CK2_POINT(NEW) |
| CK3_OA | CK3_OA(OLD) | CK3_OA(NEW) |
| CK3_OB | CK3_OB(OLD) | CK3_OB(NEW) |
| CK3_POINT | 0000 | CK3_POINT(NEW) |
| CK4_OA | CK4_OA(OLD) | CK4_OA(NEW) |
| CK4_OB | CK4_OB(OLD) | CK4_OB(NEW) |
| CK4_POINT | 0000 | CK4_POINT(NEW) |

DIGITIZED BANK CHECKS VALIDATED BY DIGITAL SIGNATURES

The invention concerns a check-clearing process of a banking system, wherein paper checks are replaced by digitized versions of the paper checks. Commonly, the digitized versions are maintained in a secure central location, and copies of the digitized versions are sent to the banks upon which the checks are drawn. Authenticity of the copies is sometimes established by the use of digital signatures. The invention relates to issues which arise from the use of digital signatures in this context.

BACKGROUND

Recipients of bank checks deposit the checks in the recipients' bank accounts. The depositary banks then transmit the deposited checks to a central clearing station, which in the United States managed by a division of the federal government.

FIG. 1 illustrates a stack 3 of paper bank checks which represents checks collected at the clearing station. One check 6 is shown in detail. The clearing station undertakes a check-clearing process, wherein accounting is done to settle accounts among the banks involved. The clearing house then distributes the checks to the banks on which they were drawn.

Recently, with the advent of inexpensive, high-speed digital computation, and because of various governmental regulations, a movement has originated to eliminate the distribution of the paper bank checks. Instead, optical scanners are used to generate digitized images of the checks, and the digitized images are then distributed electronically to the drawee-banks. The paper checks 3 in FIG. 1 are then held in long-term storage, in case they are needed.

FIGS. 2-5 illustrate conceptually the digitizing process. Each check 6 is divided into pixels 9, as in FIG. 2. FIG. 2 is a simplification: the number of pixels actually used is much larger than that indicated by the Figure.

Each pixel is assigned a value, or number, which indicates optical properties of the pixel. For example, if grey-scale photography is used, then the number indicates the relative greyness of the pixel, on a scale ranging from pure white to pure black. FIG. 3 provides an illustration, and shows three pixels 9. If a pixel is pure black, and if one byte is associated with each pixel, then the pixel is assigned the number 255. If a pixel is pure white, it is assigned the number zero. If a pixel is grey, it is assigned a number between 1 and 254, depending on the degree of greyness.

The numbers for the pixels are arranged in a convenient sequence, such as that suggested by FIG. 4. The top row of pixels is assigned positions 1 through 37 in the sequence. The second row is assigned positions 38 through 74, and so on.

Thus, each bank check is, in effect, converted to a sequence of numbers, such as the sequence shown in FIG. 5, wherein B(1) refers to the first byte in the sequence, and represents the grey-scale value of pixel number 1 in FIG. 4. Byte B(2) in FIG. 5 represents the value of pixel number 2 in FIG. 4, and so on. The sequence is shown as terminating in B(10,000) because ten thousand is considered a good estimate of the total number of pixels currently used to digitize a bank check.

The sequence of numbers of FIG. 5 will be termed the "image-data" of the check.

Once the image-data is generated, copies of the original check can be produced from the image-data. The copies can be displayed on a computer screen, printed on paper, or both, using known methods.

However, in order to produce accurate copies, certain technical information must be known about the original image-data. For example, the actual size of each pixel 9 in FIG. 2 must be known, to create a copy of the same size as the original.

As a second example, the length and width of the image, in pixels or equivalent, must be known. As a third example, it must be known whether the pixels represent color-values (not discussed herein), grey scales, or other representations. As a fourth example, it must be known whether the image-data is compressed and, if so, what compression algorithm was used.

This technical information, and other technical information, is generally attached to the image-data. Various file formats have been developed which package the two groups of data together, namely, (1) the image-data and (2) the technical information.

One file format which has achieved widespread usage is the Tagged Image File Format, or TIFF. A specification which defines the TIFF format is available from Adobe Systems, San Jose, Calif., USA.

Some banking systems have adopted the TIFF format for storage of the digitized images of their bank checks. In addition, some of these banking systems store four images of each check within the TIFF file. A first image corresponds to the front of the check, and a second image corresponds to the back of the check, as it initially arrives for processing. Later, during the check-clearing process, additional information can be added to the check, such as routing information. Two additional images, front and back, are created of the modified check, thereby explaining the total of four images.

The TIFF convention, or standard, allows these multiple digital images to be stored in a single data file. The use of a single file, as opposed to four separate files, provides convenience of handling, since only a single file must be named and tracked, as opposed to four files.

The Inventors have identified potential problems in this single-file approach to storage of multiple images, and have developed stratagems which reduces the problems.

OBJECTS

An object of the invention is to provide an improved check-clearing system for banks.

A further object is to provide a system for authenticating copies of digital images of bank checks.

SUMMARY

In one form of the invention, multiple digitized image-files of bank checks are combined into a single composite file. However, for technical reasons, the content of the original image-files must be altered somewhat, to accommodate certain formatting requirements of the composite file. Thus, if an image-file is later extracted from the composite file, the extracted image-file will differ from the original. The invention removes the differences, and allows accurate recovery of the original image-file.

BRIEF DESCRIPTION OF THE DRAWINGS

FIG. 11 illustrates a table, showing data which has changed when a file is added to the composite file of FIG. 9, and also the original data.

DETAILED DESCRIPTION

A bank customer can request a paper copy of a cancelled check. If digitized images of the cancelled checks were returned to the customer's bank, as described in the Background of the Invention, the bank locates the digitized image, and prints a visual copy onto paper for the customer.

The Inventors have observed that a question can arise as to whether the digitized image which the bank retrieves is an accurate copy of the digitized image initially created when the check underwent the clearing process.

One resolution to this question can be achieved by adding a digital signature to the original digitized image. Some basic principles of digital signatures will be explained, to explain how digital signatures can verify authenticity of a copy of the original digitized image.

Figure 6:
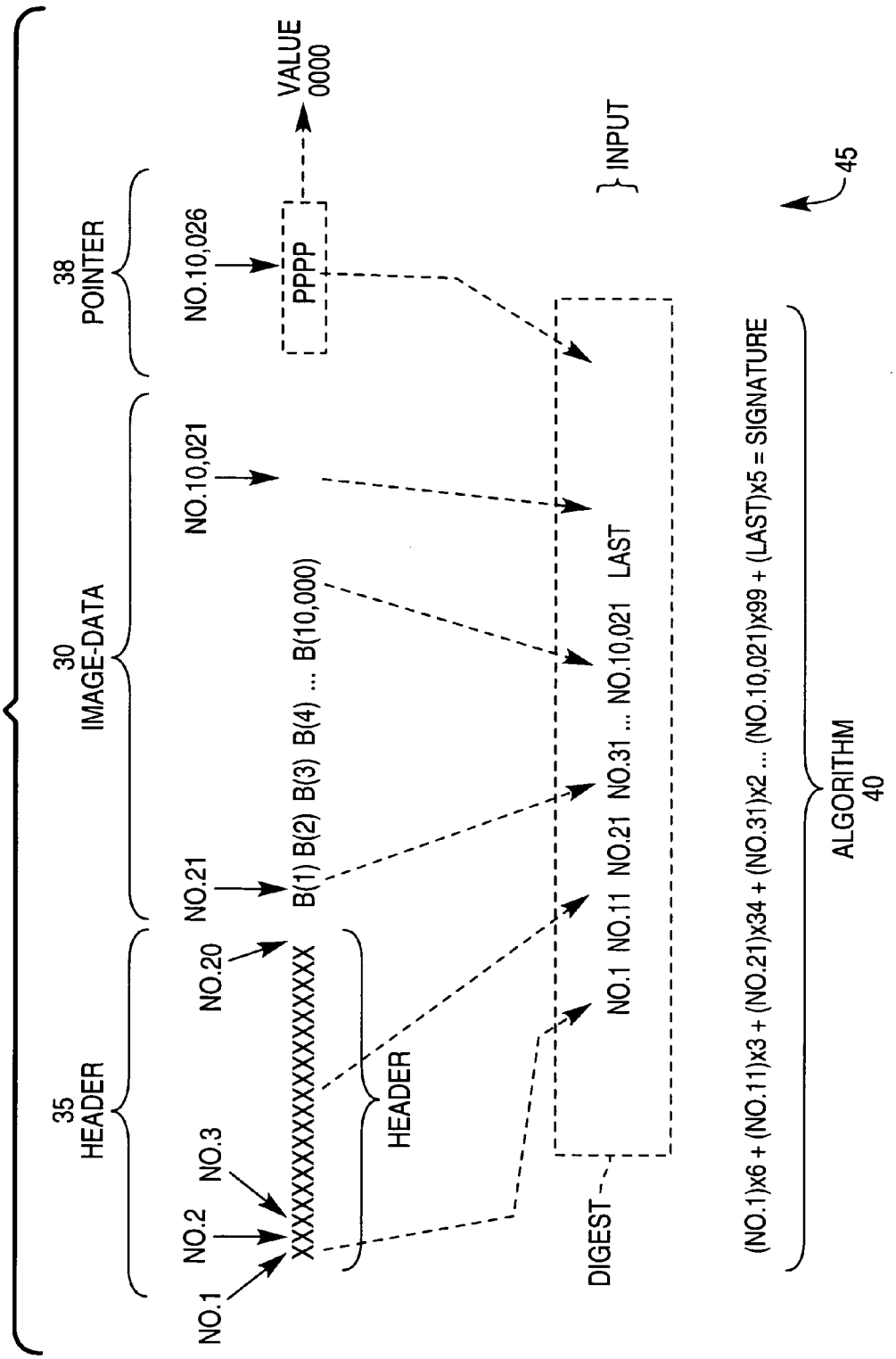
FIG. 6 illustrates in simplified form the creation of a digital signature for a file.

FIG. 6 represents a generalized graphics file, which may include (1) image-data 30 of a check, indicated as bytes B; (2) a header 35 which includes other information, such as the technical information discussed above, and represented by bytes X; and (3) a pointer 38, containing bytes P, which may point to data which relates to another image of the check, within the same file.

All bytes B, X, and P can be treated as numbers, for purposes of the digital signature, even though the bytes may, in fact, represent other information, such as alphabetical characters.

To generate a digital signature, one first selects a subset of the numbers, or bytes, in the file. (One could use all numbers in the file, and the concept of a digital signature does not preclude usage of all the numbers. The Inventors point out that trade-offs are involved. For example, usage of all numbers in the file may require greater computation time. However, a computer program which develops a signature from all the numbers may be easier to generate. Further, even if usage of all numbers imposes certain difficulties, the difficulties may be justified by the fact that the file is extremely valuable.)

This selected subset is called the "digest" of the file. A formula determines how the digest is selected. As a simple example, the formula may specify that (1) the first byte, (2) every tenth byte thereafter, and (3) the final byte are used. This selection of bytes is indicated in FIG. 6, adjacent the word "INPUT."

The digest is then applied as input to a selected algorithm 40 in FIG. 6. The algorithm shown is a simple polynomial equation, for-ease of illustration. Actual algorithms used in practice can be much more complex. The algorithm 40 produces an output, which is the signature 45, and is a number. This signature/number is then associated with the file.

To determine whether a copy of the original file is identical to the file itself, one repeats the process just described, but by applying the process to the copy, rather than the original file itself. That is, one extracts a digest of the copy, and applies the digest as input to the same secret algorithm. If the same signature is obtained, then it is known, with an extremely high degree of probability, that the copy is an accurate rendition of the file. If the same signature is not obtained, it may safely be assumed that the copy is not accurate.

The Inventors have discovered problems when this approach is applied to files containing multiple digitized images. The problems will be explained by reference to FIGS. 7-9.

Figure 1:
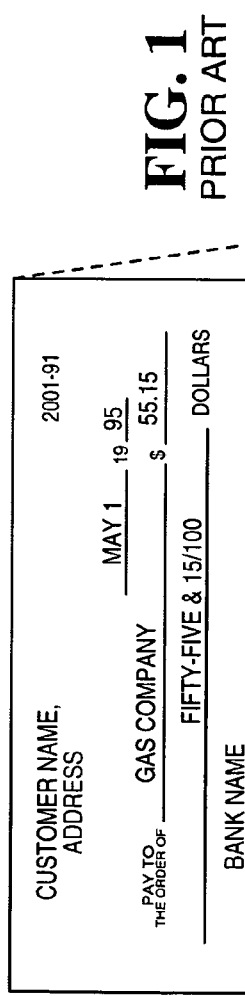
FIG. 1 illustrates a stack 3 of bank checks.
Figure 3:
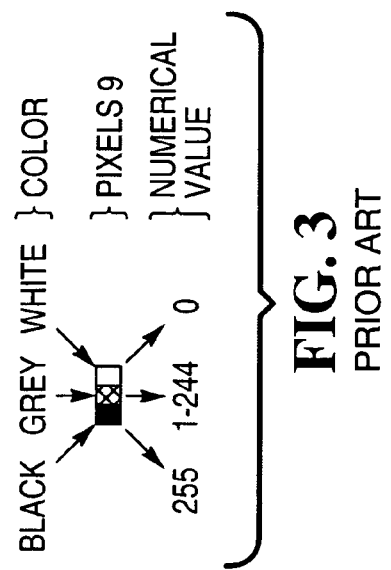
FIG. 3 illustrates different numerical values assigned to three different pixels 9.
Figure 2:
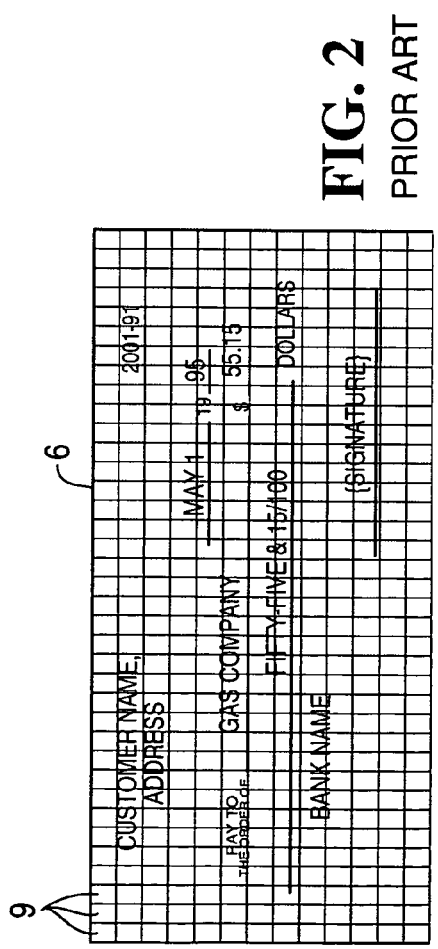
FIG. 2 illustrates pixels 9.
Figure 4:
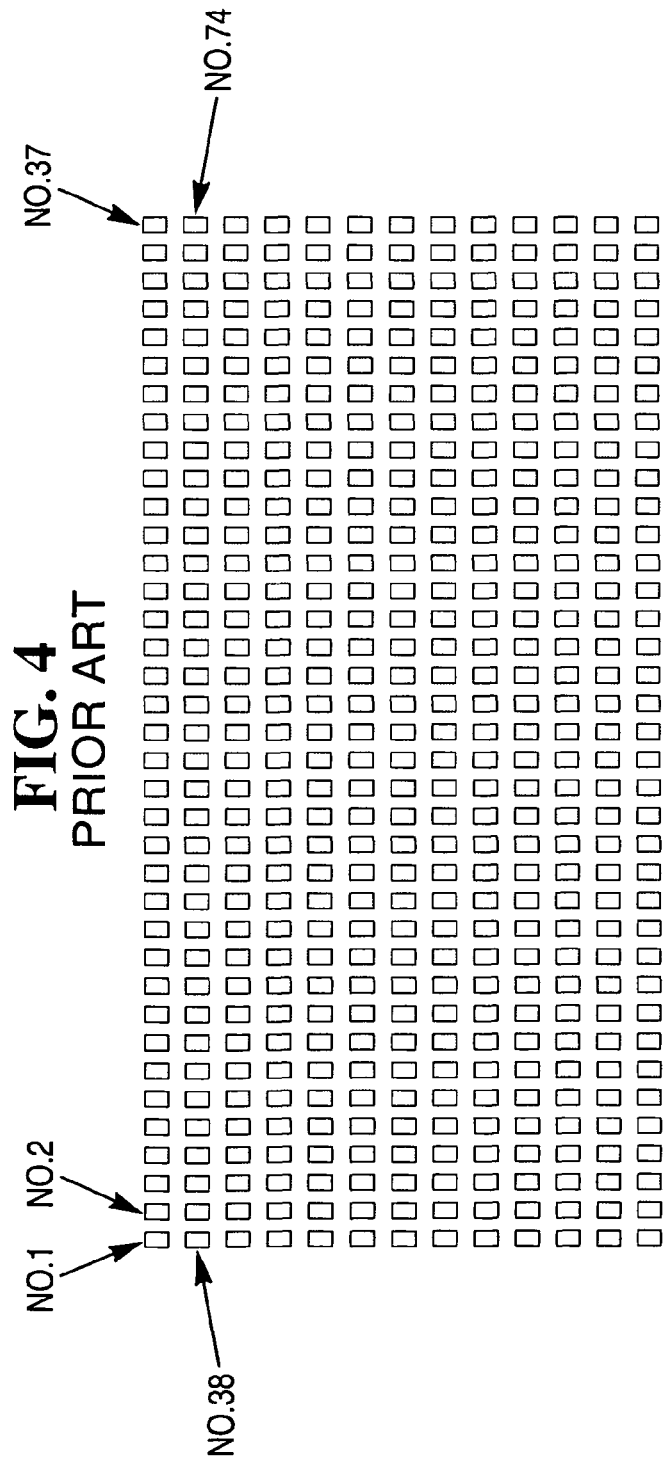
FIG. 4 illustrates one type of sequence in which pixels can be arranged.
Figure 5:
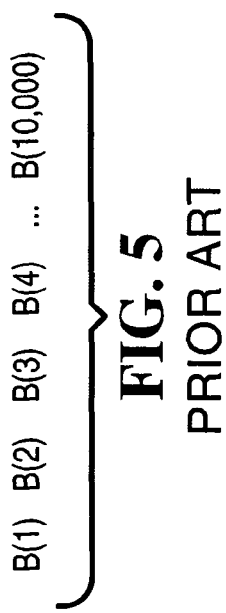
FIG. 5 illustrates a sequence of bytes, each corresponding to a pixel.
Figure 7:
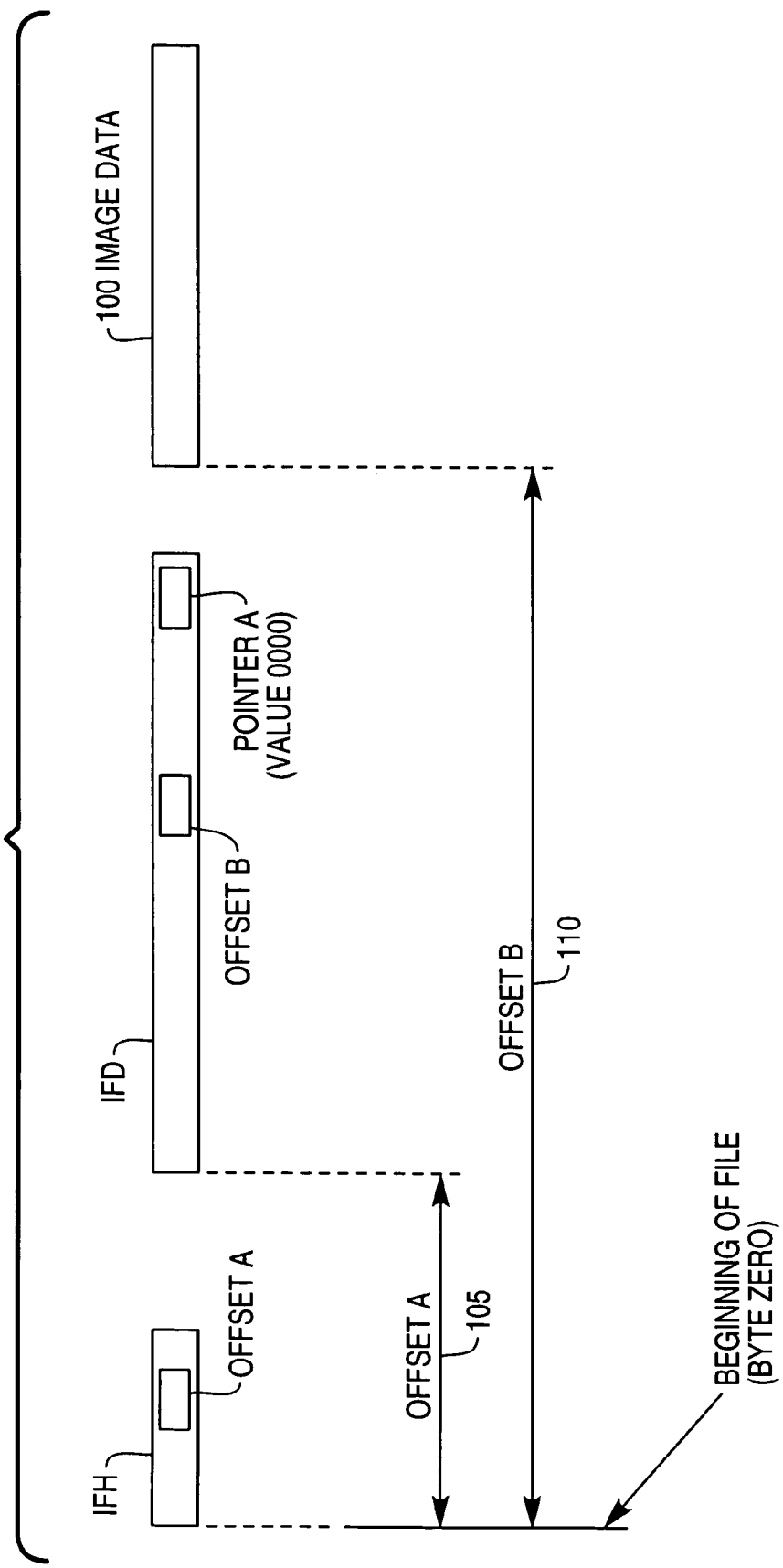
FIG. 7 illustrates contents of an exemplary graphics file.

FIG. 7 shows schematically simplified content of a TIFF file for a single bank check. Block 100 represents the image-data, which holds the byte-sequence derived from the bank check, and corresponds to the byte sequence shown in FIG. 5.

The TIFF file also contains two headers. One header, the Image File header, IFH, includes (1) a pointer, labeled OFFSET A, and (2) other technical data. The pointer OFFSET A points to another header, the IFD, Image Format Directory, by specifying the offset of the header IFD from the beginning of the file, in number of bytes. The offset is indicated by distance 105. The header IFD contains the technical information (check dimensions, type of compression, etc.) discussed above.

The pointer OFFSET A is needed because, under the TIFF convention, the header IFD need not be located immediately subsequent to the previous header IFH.

Another pointer is present, POINTER A, and is located in the IFD header. This pointer serves two functions. One function is a result of the fact that the TIFF file may contain multiple image-data, as explained above. In such a case, each collection of image-data is assigned its own IFD header. For example, in the check-system under discussion, a single TIFF file will contain four digitized images of a check. The TIFF convention requires one header IFD header for each digitized image, for a total of four IFDs. In such a case, shown in FIG. 8, POINTERs A (indicated as OFFSETs O3, O5, and O7) are used to point to the next headers of type IFD.

However, in FIG. 7, the TIFF file contains a single digitized image, and not multiple digitized images. Thus, a single IFD is present. Consequently, POINTER A is set to 0000, because no subsequent IFD is present. Similarly, OFFSET O9 in FIG. 8 has a value of 0000, indicating that no subsequent IFD is present.

These values of 0000 indicate the second function served by POINTER A. That second function is to indicate that no further headers IFD are present.

Thus, POINTER A either (1) points to the next IFD or (2) indicates that no further IFDs are present.

Header IFD also contains another pointer, OFFSET B, which indicates the beginning of the image data 100, measured from the beginning of the file. Distance 110 indicates OFFSET B.

A digital signature can be taken of the file of FIG. 7, in the manner of FIG. 6, and used to verify authenticity of copies.

However, if the single file in FIG. 7 is combined with other single files into a single TIFF file, and if the TIFF convention is followed, the digital signature of the original single file can be lost, as will now be explained.

Figure 8:
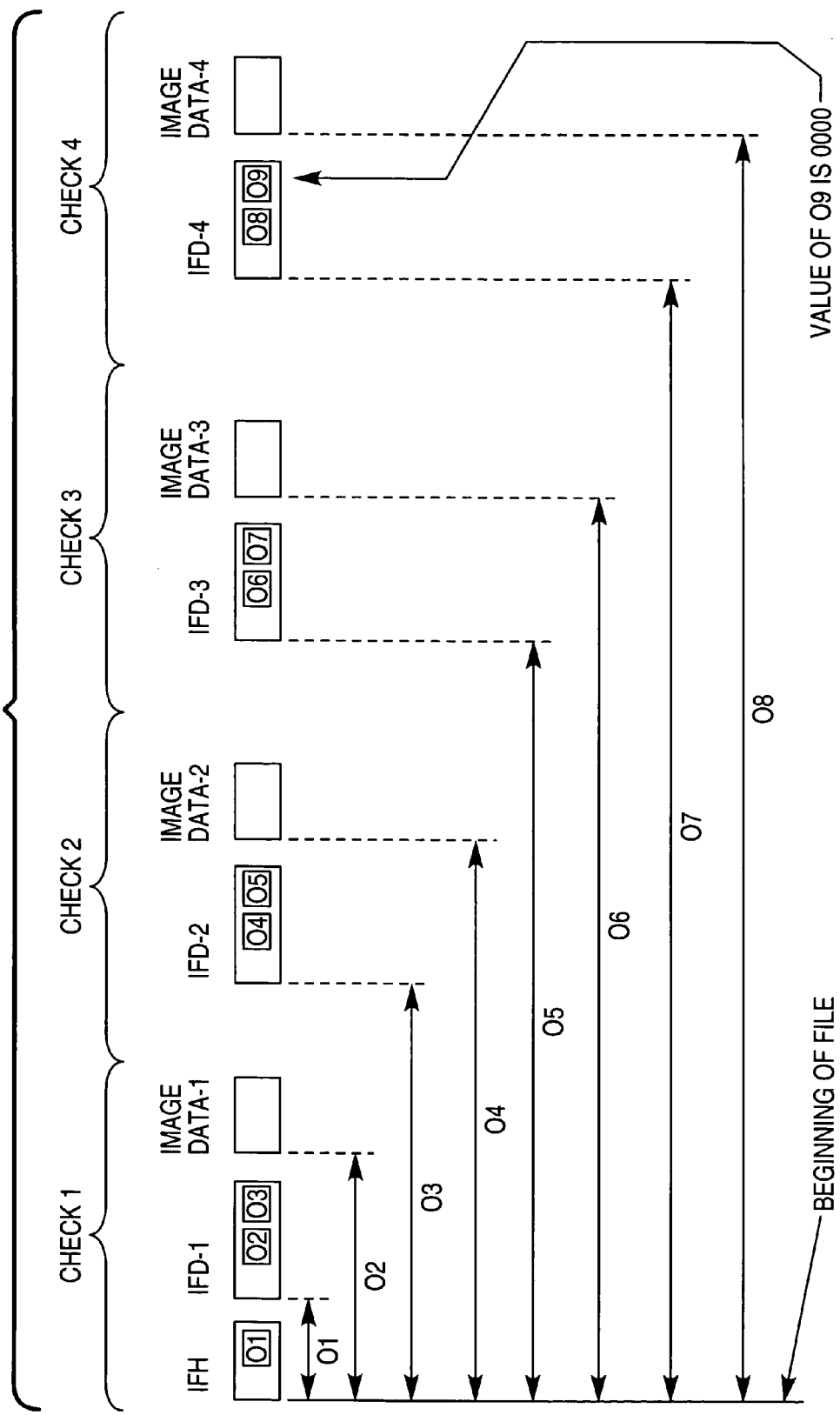
FIG. 8 illustrates contents of an exemplary graphics file, which contains four files of the type shown in FIG. 7.

FIG. 8 illustrates digital images of four checks, packaged into a single file. A single IFH is present, and may, or may not, be viewed as part of CHECK 1, for reasons which will become clear.

Each check contains image data, IMAGE DATA-1, IMAGE DATA-2, etc. Each check also contains an IFD, Image File Directory, for each block of image-data. The IFDs contains the technical information discussed above.

Pointers are present, labeled O1 (offset 1), O2 (offset 2), and so on. Offsets O3, O5, O7, and O9 correspond in function to POINTER A in FIG. 7. Each points to the beginning of the next IFD, with the exception of offset 9, which has a value of 0000, as indicated. The value of 0000 indicates that no further IFD's follow.

Figure 9:
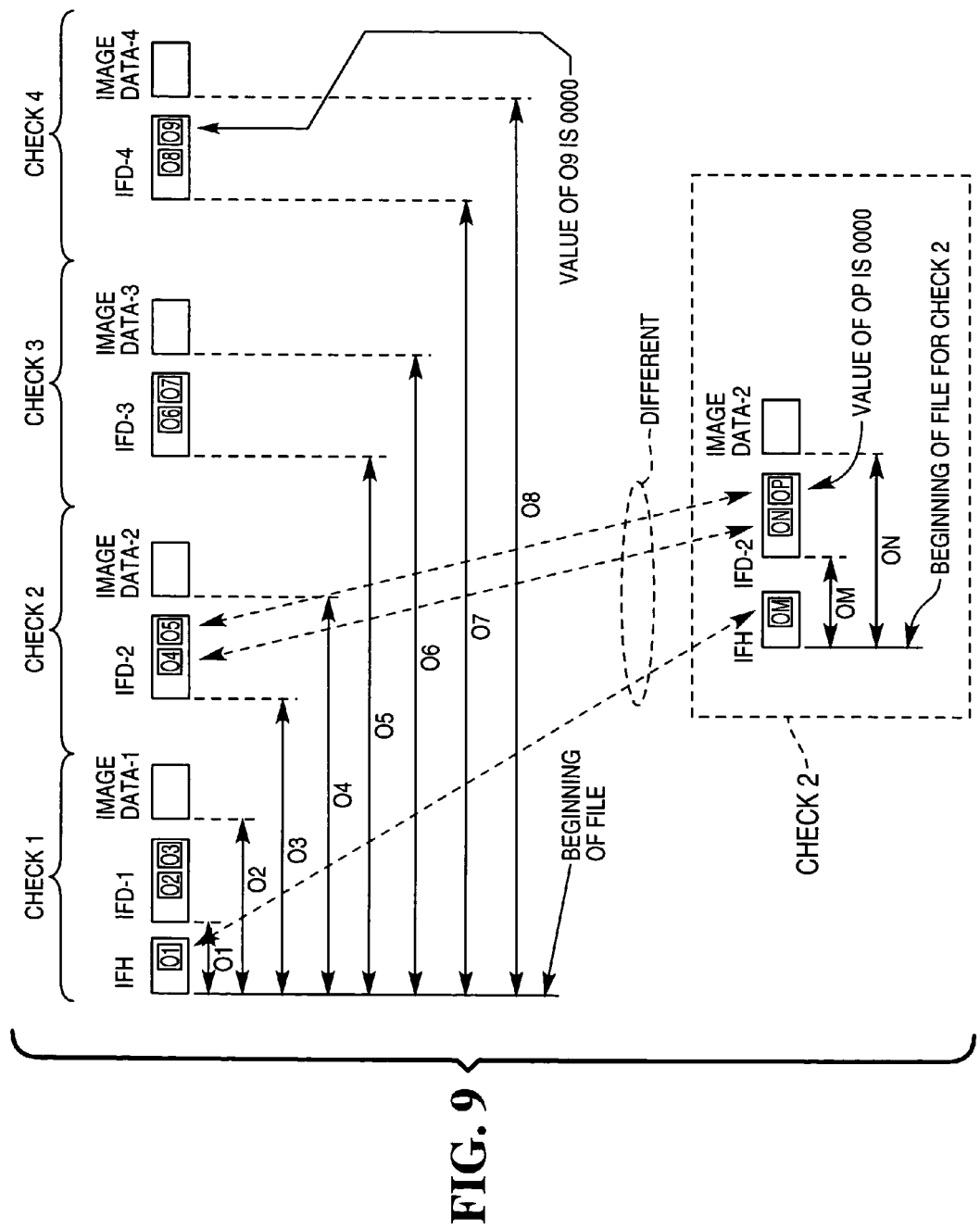
FIG. 9 illustrates differences between (1) the file of FIG. 8 and (2) the original of one of the files contained in the file of FIG. 8.

FIG. 9 illustrates how the original TIFF file for CHECK 2 differs from the corresponding file for CHECK 2, when combined with three other TIFF files, as in FIG. 8. In FIG. 9, original CHECK 2 contains an offset OM, which points to IFD-2. (OFFSET OM corresponds in function to OFFSET A in FIG. 7.) However, in the multiple TIFF file, the corresponding offset O1 will be different, because offset O1 points to IFD-1.

That is, in concept, the header IFH in FIG. 9 is used for all four check-files. Plainly, OFFSET O1, contained in that header, does not point to IFD-2 for CHECK 2. (It may occur that OFFSET O1 has the same numerical value as OFFSET OM, because, in FIG. 9, IFD-1 may be adjacent to IFH in the composite file, and also IFD in CHECK 2 may be adjacent to IFH. However, that would be coincidence, and cannot be relied upon.)

Therefore, the value OM in CHECK 2 has (probably) been changed to the value of O1 in the composite check, as indicated by the dashed double-arrow pointing to those two offsets.

Similarly, offset ON in CHECK 2 will be different from corresponding offset O4. Also, offset OP in CHECK 2 will be different from corresponding offset O5.

Figure 10:
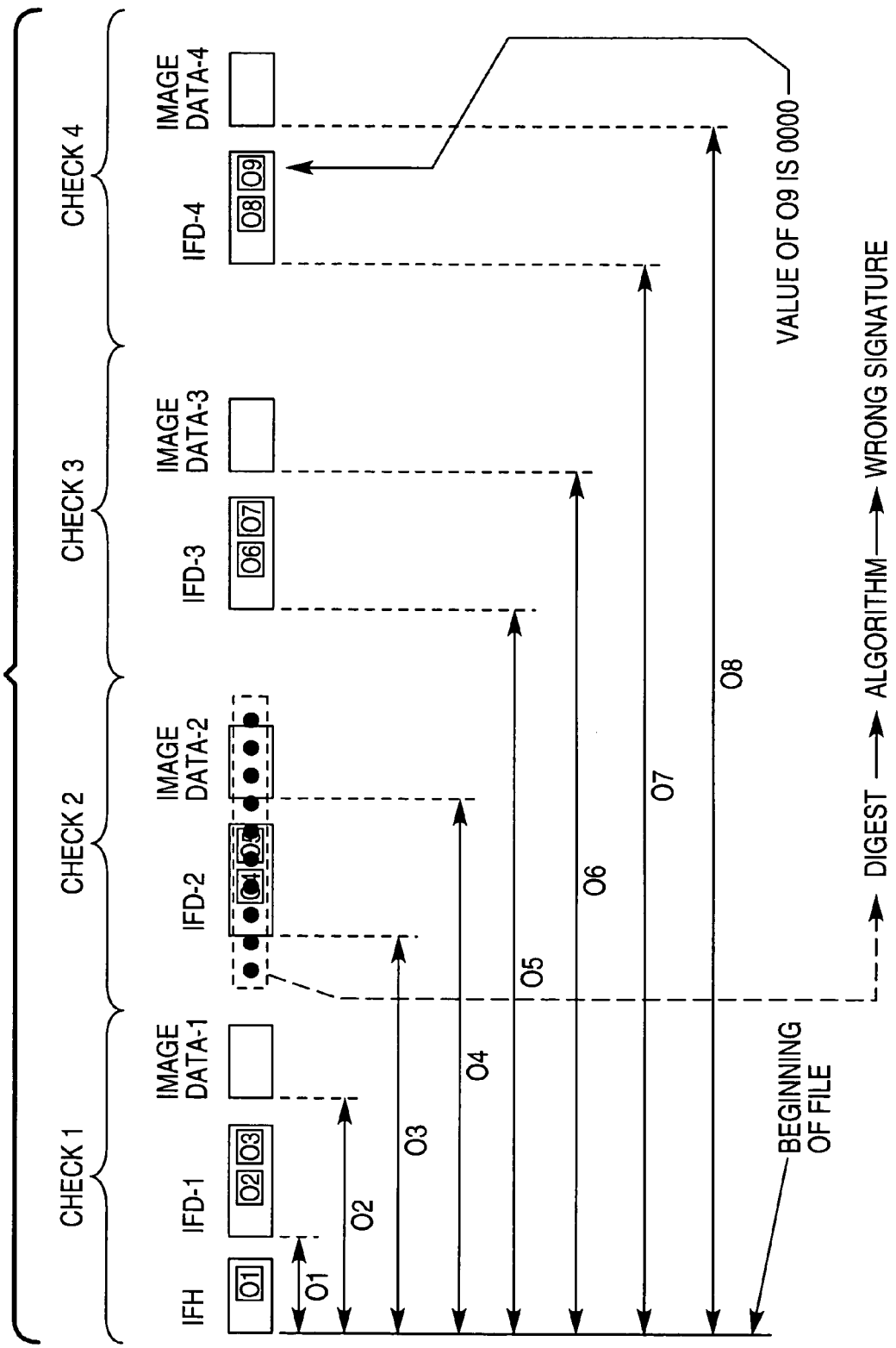
FIG. 10 illustrates the differences of FIG. 9, in a different way.

Therefore, assume that a formula is used to take a digest from CHECK 2 in FIG. 10. The dots indicate bytes collected from the data corresponding to CHECK 2, and collectively represent the digest. That digest, when input to the algorithm, will produce a given digital signature. That digital signature will be different from that obtained from the original file for CHECK 2, prior to insertion into the composite file of FIG. 9. One reason lies in the differences in offsets just discussed.

Thus, a problem arises in attempting to use digital signatures to validate a copy of a digitized check, when taken from a composite image file containing several checks.

Figure 12:
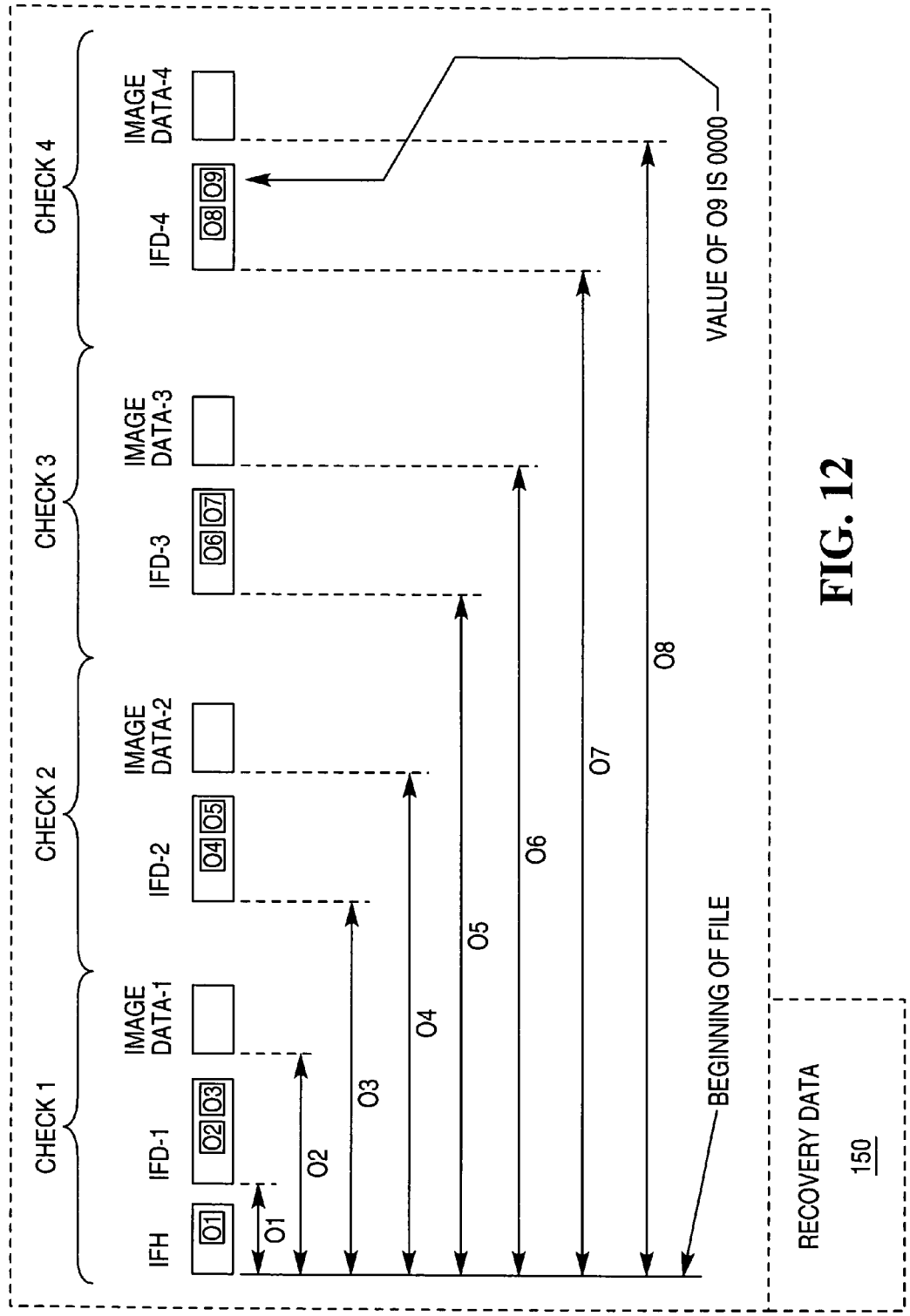
FIG. 12 illustrates one form of the invention.

One stratagem for mitigating or eliminating this problem is shown in FIGS. 11 and 12. FIG. 11 is a table. In the left column, the terms CK1, CK2, etc. refer to check 1, check 2, etc.

In the same left column, the terms OA, OB, and POINT, refer to OFFSET A, OFFSET B, and POINTER A in FIG. 7. Thus, the term "CK1-OA" refers to OFFSET A in check 1. FIG. 7 shows this OFFSET A in a generalized check. The term "CK1-OB" in FIG. 11 refers to OFFSET B in check 1. FIG. 7 shows this OFFSET B in a generalized check. And so on in FIG. 11.

In the central column of FIG. 11, "old" or original values of the parameters labeled in the left column are indicated. These old values refer to the values in the original, separate TIFF files generated for each digitized check-image. FIG. 7 represents one such file.

That is, when one of the four digitized images of a check is initially created, one of the four triplets in the center of FIG. 11 will be contained in that digitized image. (Of course, FIG. 11 is a simplification of the TIFF convention, the data in question need not contain triplets.) The right column in FIG. 11 indicates the new values of the parameters, as stored in the multiple file, as in FIG. 8. In general, the new values will be different from the old values.

One exception lies in the POINTER A of FIG. 7. In a single, separate file, the POINTER A will have a value of 0000, as discussed above, indicating that no further IFDs follow. However, in the last file within the composite file of FIG. 8, which is that for CHECK 4, the corresponding POINTER A (i.e., OFFSET 9, or O9) also has a value of 0000. Thus, the single check which is placed in the last position within the composite file of FIG. 9 will keep its value of 0000 for the pointer corresponding to POINTER A in FIG. 7. More specifically, in this example, in FIG. 11, the parameter CK4-POINT will have a value of 0000 in both the separate file and the composite file.

From another perspective, the central column of FIG. 11 illustrates certain data for each individual TIFF image, the data being of the type shown in FIG. 7. The right column of FIG. 11 illustrates corresponding data, but for the composite file shown in FIG. 8.

In one form of the invention, sufficient data is associated with the data of FIG. 8, to allow recovery of the central column of FIG. 11. This data is indicated as recovery data 150 in FIG. 12. This data may be embedded in the composite TIFF file, attached to the TIFF file, or stored in another file, which is linked or otherwise associated with the composite TIFF file.

The invention specifically contemplates a file format which contains separable sub-files. For example, a TIFF file can be concatenated with another file, such as the recovery data 150 of FIG. 12. An internal end-of-file marker, I-EOF separates the two files. Thus, an ordinary TIFF reader knows that the TIFF file ends at the I-EOF, and ignores data following the I-EOF.

However, another processing program knows that data of interest to it lies beyond the I-EOF, and locates the data based on the I-EOF. For example, a digital signature recovery program would locate the table of FIG. 11, or subset thereof, after the I-EOF, and use it to re-construct an original TIFF file.

One form of the invention lies in the process encompassing the following steps.

1. Generating multiple digitized images for each bank check processed in a check-clearing process.

2. Packaging each digital image into an individual graphics file.

3. Deriving a digital signature for each graphics file.

4. Modifying parts of the graphics files, in order to package the graphics files into a single, composite file containing multiple digitized images.

5. Storing data indicating the modifications, so that the individual graphics files can be recovered from the composite file and produce the correct digital signatures.

Additional Considerations

1. The term "digest" is a term-of-art, and refers to the subset of data extracted from a file, which is used as input to an algorithm which produces a digital signature. The subset is not precluded from including all characters in the file.

2. The term "digital signature" is a term-of-art. Digital signatures are described in the text "Applied Cryptography," by Bruce Schneier (John Wiley & Sons, New York, 1996, ISBN 0 471 12845 7). This text is hereby incorporated by reference.

This term-of-art will be emphasized by a counter-example. "Digital signature," as a generic term, could be used to describe a handwritten signature which has been digitized. That is, as a generic term, it could describe a bitmap of a handwritten signature.

But, as a term-of-art, it does not describe such a bitmap.

In one usage as a term-of-art, it describes a result, produced by an algorithm, to which a "digest" is applied as input.

3. The term "file," referring to "computer file," is a term-of-art. One definition of such a "file" is a collection of data which is processed by a computer, or its operating system, as a unit.

For example, a computer contains a microprocessor. Assume that no operating system is installed in the computer. One can order the computer to print data on a printer, by issuing to the microprocessor, for each character of the file to be printed, the proper sequence of "print" commands. The microprocessor then issues its own commands to the memory location, or port, to which the printer is connected.

However, if an operating system is installed it can allow one to specify the data to be printed by means of a file name, as opposed to issuing individual instructions for each character in the file to be printed.

Similarly, the operating system allows the data to be stored, and retrieved, based on the file name.

Thus, one characteristic of a "file" is that it can be processed in certain ways, based on its name, rather than on the individual characters within it.

Consequently, a mere collection of data is not necessarily a "file." It can become a "file" by giving it a name, and formatting it, both in a manner usable by an operating system. As a specific example, while a collection of stock market reports in a newspaper may constitute "data," the collection is not necessarily a "file," or "data file."

One reason is that the data is not usable by an operating system. Even if the data is encoded as ASCII bytes, it still has not become a "file." The mere collection of bytes cannot be handled by an operating system, until properly formatted and named.

4. In the examples given herein, all pointers indicate positions of items, relative to the beginning of the file, as in FIG. 7, for example. Such pointers can be called "absolute" pointers, because they all refer to a single reference, or base point.

However, the principles of the invention can still be used if the pointers use different base points. For example, pointer A can indicate the distance from the beginning of a file to item A. Pointer B can indicate the distance from the end of item A to item B, and so on.

5. This point will explain the following concepts. In the original TIFF files, (or other type file), such as that of FIG. 7, "parameters" having "values" are present. When the TIFF files are combined into the composite file of FIG. 8, the "parameters" are still present, but the "values" may have changed. The invention allows recovery of the original "values." The explanation here follows.

Two terms can be, defined, namely, "parameter" and the parameter's "value." For example a specific tag, under the TIFF standard, can be termed a parameter.

Also, a specific location in the file can qualify as a parameter. For example, the Nth byte from the beginning can be a parameter.

The parameters are assigned values. That is, the "parameters" identify the bytes of interest in various ways, but the content of those identified bytes are the "values" of the parameters.

To repeat: a group of bytes (a parameter) can be identified by a label. For example, the label may be "$TAG_{13}$ 53" and the bytes identified are the two bytes immediately following the label. Or a group of bytes may be identified by convention, wherein the first N bytes in a file represent parameter 1, the next M bytes represent parameter 2, and so on.

The numerical value of each group of bytes is the "value" of the parameter.

By analogy, in a bank check, the blank "date" field is a parameter, and the handwritten contents of the field represent the value of the parameter.

From another perspective, the parameter describes the meaning of the value. For example, the number 32 can be a value, which has little meaning in itself. However, if "32" is the value of a "date" parameter, then it can refer to February 1, the 32nd day of the year.

Under the invention, parameters with their associated values are stored the TIFF files of the individual bank checks. For example, OFFSET 2, or O2, in FIG. 9 is a parameter, and the number assigned to O2 is the parameter's value.

When the TIFF files are combined into the single composite file the parameters are still present, but the values can change.

As a hypothetical example, in FIG. 9, the parameter containing the value ON tells a TIFF reader that the image data is located a certain number of bytes from the beginning of the file. The TIFF standard (or whatever standard is being used) tells the designer of the TIFF reader how to find the parameter having this value.

However, in the composite file, at the top of FIG. 9, the value of the parameter has been changed, and is now indicated as O4. The value indicates the distance from IMAGE DATA-2 to the beginning of the file, which is different, compared with the TIFF file for check 2 individually.

Therefore, in one form of the invention, an individual TIFF file contains one or more parameters, each having a value. The parameters are retained when the individual files are collected into the composite file, but the values of the parameters may change.

Since the values may change, if those changed values are included in a digest created based on the composite file, the digital signature will change.

6. TIFF files have a format which is compatible with a TIFF reader, which can read the TIFF files, and then display a graphical image of the image-data, as by printing the image, or displaying the image on a monitor.

It could be said that the format of the TIFF file is also compatible with an ordinary text editor, which can read the file and display the individual bytes, but which cannot display a graphical image of the image data. However, this latter meaning is not intended herein.

One definition of "compatible" can be derived by observing a common characteristic of all computer files, namely, that they all consist of bits, which are arranged as characters, such as bytes. However, the format of a TIFF file provides additional functionality beyond the mere presence of bytes, such as the ability to cooperate with a TIFF reader to produce a graphical image.

Similarly, an HTML document is formatted in a manner which allows an HTML reader to display the document in a way specified by the codes within the HTML document.

Similarly, a digitized music file is formatted in a manner which allows a music player to play a song. A similar comment applies to a movie file.

Thus, one definition of "compatible" is that a file is "compatible" with a program if (1) the two can cooperate to produce predetermined functionality, such as displaying an image or movie, or playing music, and (2) other files exist which cannot cooperate with the program to produce that functionality.

As a negative definition, the mere ability of a program to read data from a file does not make the file compatible with the program.

7. It is possible to characterize one form of the invention so that it superficially resembles a certain prior-art process. For example, it could be said that the invention begins with files which produce digital signatures. The files are combined into a single composite file, with modifications, so that the files no longer produce their digital signatures. The invention extracts the files from the composite file, and removes the modifications, so that the extracted files again produce the proper digital signatures.

It could be said that an ordinary compression process has these features. That is, the process of (1) combining files into a single file and (2) compressing the single file causes the individual files to fail to produce their digital signatures. Then, if the single file is de-compressed, and the individual files are recovered, they will now correctly produce their digital signatures.

However, one distinction between this process and one form of the invention is that the compressed file is not usable by a program with which the files are "compatible." Also, under the invention, when a TIFF file is placed into the composite file, some content of the TIFF file is modified. In general, that does not occur in the compression process. That is, the compression process is designed not to modify content. The compression process modifies the symbols representing content, but does not modify the content itself.

8. The discussion above has focused on TIFF files. However, the invention is applicable to computer files generally, which are collected into a single composite file.

9. Four files can be extracted from the composite file of FIG. 8, with a copy of the IFH being used for each sub-file. Digital signatures can be generated for each of the sub-files. Digital signatures can be generated for each of the sub-files, but as-present in the composite file.

If this were done, then the same digital signatures would be obtained from the sub-files, after extraction, compared with the sub-files, as present in the composite file.

However, these sub-files, after extraction, are not compatible with a TIFF reader, for reasons described herein.

10. It was stated above that four images were generated of a check: two images of the check as it appeared on arrival, and two images of the check after any alterations. Another reason for generating multiple images lies in error correction techniques. One set of images can be generated in a black/white format, and another set generated in grayscale format. The two sets of images allow recovery of content which may have been lost in the digitizing process.

Numerous substitutions and modifications can be undertaken without departing from the true spirit and scope of the invention. What is desired to be secured by Letters Patent is the invention as defined in the following claims.

What is claimed is:

1. A method, comprising:
   a) creating a digitized image of a bank check;
   b) placing the digitized image into an original file CHECK-1 which
      i) conforms to a published tagged image format;
      ii) contains pointers which allow a file reader to locate predetermined data within the original file CHECK-1;
   c) repeating steps (a) and (b) to create original files CHECK-2, CHECK-3, and CHECK-4, each corresponding to a respective bank check;
   d) modifying pointers in the original files to produce modified files CHECK-1, CHECK-2, CHECK-3, and CHECK-4;
   e) placing the modified files CHECK-1, CHECK-2, CHECK-3, and CHECK-4 into a composite file, wherein
      i) the modified pointers in modified files CHECK-1, CHECK-2, CHECK-3, and CHECK-4 are effective to allow a file reader to locate the respective predetermined data within the composite file; and
      ii) the modified pointers are not effective to allow a file reader to locate the respective predetermined data within the original files CHECK-1, CHECK-2, CHECK-3, and CHECK-4;
   f) storing recovery data which indicates differences between the modified files CHECK-1, CHECK-2, CHECK-3, and CHECK-4 and the corresponding original files; and
   g) using the recovery data to recover one of said original files from the composite file and print a paper representation of a check, based on the original file recovered.

2. Method according to claim 1, in which the recovery data comprises a table which contains (A) first values for parameters contained in the original files and (B) second values, different from the first values, for corresponding parameters in the modified files.

3. Method according to claim 1, in which
   A) an original digital signature is generated for each original file;
   B) said original files undergo modification when combined into the composite file; and
   C) the modification of an original file alters the digital signature, if taken, of that file; and
   D) the recovery data allows (i) removal of the modification and (ii) attainment of the original digital signature.

4. Method according to claim 3, in which an original file, after recovery, produces the original digital signature of the original file, as existing prior to combination into the composite file.

5. Method according to claim 1, in which the recovery data is stored in a file separate from the composite file.

6. Method according to claim 1, in which i) original file CHECK-1, when processed according to a predetermined formula, produces a digest A, and ii) original file CHECK-1, as contained within the composite file, when processed according to the formula, produces a digest B, different from A.

7. Method according to claim 1, in which digital signatures are produced from original files and
   1) original file CHECK-1 produces a first digital signature when processed by a predetermined algorithm, and
   2) file CHECK-1, as contained within the composite file, produces a second digital signature when processed by the predetermined algorithm.

8. A method, comprising:
   a) creating a digitized image 1 of a bank check 1;
   b) placing the digitized image 1 into an original file 1 which
      i) conforms to a published tagged image format;
      ii) contains data 1 which describes technical properties of digitized image 1; and
      iii) contains one or more original first pointers which
         A) indicate addresses within the original file 1 at which data 1 are located and
         B) allow a file reader to locate the data 1 within the original file 1;
   c) creating a digitized image 2 of a bank check 2;
   d) placing the digitized image 2 into an original file 2 which
      i) conforms to a published tagged image format;
      ii) contains data 2 which describes technical properties of digitized image 2; and
      iii) contains one or more original second pointers which
         A) indicate addresses within the original file 2 at which data 2 are located and B) allow a file reader to locate the data 2 within the original file 2;

d) modifying the original first pointers in the original file 1 into modified first pointers, to thereby produce a modified file 1 which contains modified first pointers;

e) modifying the original second pointers in the original file 2 into modified second pointers, to thereby produce a modified file 2 which contains the modified second pointers;

f) placing the modified file 1 and the modified file 2 into a composite file, in which composite file
   i) the modified first pointers are effective to allow a file reader to locate data 1 within composite file;
   ii) the modified second pointers are effective to allow a file reader to locate data 2 within the composite file;
   iii) the modified first pointers are not effective to allow a file reader to locate data 1 within original file 1; and
   iv) the modified second pointers are not effective to allow a file reader to locate data 2 within original file 2;

g) storing the composite file and the first and second pointers;

h) extracting modified file 2 from the composite file;

i) retrieving the stored second pointers and using them to replace the modified second pointers in the modified file 2 which was extracted in paragraph (h), to thereby produce a recovered file 2; and j) printing image 2 on paper, based on the recovered file 2.

9. Method according to claim 8, in which a digital signature of original file 1, taken by a predetermined algorithm, does not match a digital signature of modified file 1, as stored in the composite file.

* * * * *